(12) United States Patent
Chen

(10) Patent No.: US 6,461,057 B2
(45) Date of Patent: Oct. 8, 2002

(54) SIMPLY STRUCTURAL AND EASILY ASSEMBLED OPTICAL FIBER CONNECTOR

(76) Inventor: Mao-Hsiang Chen, P.O. Box 90, Tainan City (TW)

( * ) Notice: Subject to any disclaimer, the term of this patent is extended or adjusted under 35 U.S.C. 154(b) by 3 days.

(21) Appl. No.: 09/758,336

(22) Filed: Jan. 12, 2001

(65) Prior Publication Data
US 2002/0094170 A1 Jul. 18, 2002

(51) Int. Cl.⁷ ................................................ G02B 6/36
(52) U.S. Cl. ...................................................... 385/76
(58) Field of Search ............................. 385/76, 77, 78, 385/81

(56) References Cited

U.S. PATENT DOCUMENTS 5,276,752 A * 1/1994 Gugelmeyer et al. ......... 385/69
RE37,080 E * 3/2001 Stephenson et al. .......... 385/78
6,224,270 B1 * 5/2001 Nakajima et al. ............. 385/78

* cited by examiner

Primary Examiner—Javaid Nasri

(57) ABSTRACT

An optical fiber connecter includes a connect head and an inserting connect member. The connect head is provided with a chamber having two opposite insert holes in two side-walls and a tapered neck member with a tapered tube protruding forward. The inserting connect member is fitted with the connect head, having an inner stepped passageway shrinking outward and a stop rim disposed in the passageway. Besides, the front portion of the inserting connect member is formed as a connect portion having on both sides two elastic insert blocks corresponding to the insert holes of the connect head, and a tapered tube protrudes out of the inserting connect member, having plural lengthwise slots to shrink elastically. In assembling, thread the optical fiber through the inserting connect member and fit the inserting connect member in the connect head to let the optical fiber thread out of the connect head.

1 Claim, 3 Drawing Sheets

SIMPLY STRUCTURAL AND EASILY ASSEMBLED OPTICAL FIBER CONNECTOR

BACKGROUND OF THE INVENTION

1. Field of the Invention

This invention relates to an optical fiber connecter, particularly to one consisting of a connect head and an inserting connect member, only a few components, assembled with q quickness and applicable to various optical fiber of any diameters.

2. Description of the Prior Art

A known conventional optical fiber connecter is mostly made integral with an optical fiber embedded inside insulating plastic materials, resulting in much inconvenience for checking in case any disconnection of the optical fiber should occur. Besides, manufacture and assembly of such components is by no means easy.

Another known conventional optical fiber connecter has come into existence. As shown in FIG. 1, it includes a sleeve 11, an engaging member 12, a connect member 13, a tube 14 and a protective ring 5 as main components.

The sleeve 11 has a center hollow passageway 110 and a passage hole 111 in its wall. The engaging member 12 is to be fitted in the passageway 110 of the sleeve 11, having a lengthwise channel 120 inside and a projection 121 on an upper side. The connect member 13 is to be inserted in the engaging member 12, having a small diameter tube 130 formed in a front portion with a fiber tube 131 extending forward out of the lengthwise channel 120 of the engaging member 12. Then, the tube 14 is fitted in the rear portion of the connect member 13 to push it move into the engaging member 12 and fixed therein.

In assembling, firstly, thread the optical fiber 4 through the tube 14 and the connect member 13, pushing the front end of outer layer 40 of the optical fiber 4 move through the tube 14 and into the connect member 13. At the same time, an intermediate covered layer 41 is also fitted in the small diameter tube 130 of the connect member 13, thus permitting the fiber 42 thread out of the fiber tube 131 of the connect member 13. Lastly, fit the protective ring 15 around the passage hole 111 of the sleeve 11, thus finishing assembly of the conventional optical fiber connecter.

As can be noted from the above description, the known conventional optical fiber connecter can hardly be made with low cost due to its numerous components, complicated manufacturing processes as well as assembly, resulting in high cost.

SUMMARY OF THE INVENTION

The objective of the invention is to offer an optical fiber connecter with only a few components, quick in assembling and applicable to various optical fibers of any diameters.

The feature of the invention is two opposite insert holes provided in two opposite side-walls of a chamber formed in a connect head, a stop rim disposed on an inner wall of a larger diameter portion of a passageway of an inserting connect member, which has its front portion shrunk in a tapered shape toward the connect head and its intermediate portion forming a connect portion provided with two elastic insert blocks corresponding to the insert holes of the chamber of the connect head and a tapered tube protruding out of the front end of the connect portion. Besides, the tapered tube has plural lengthwise slots spaced apart to shrink elastically.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
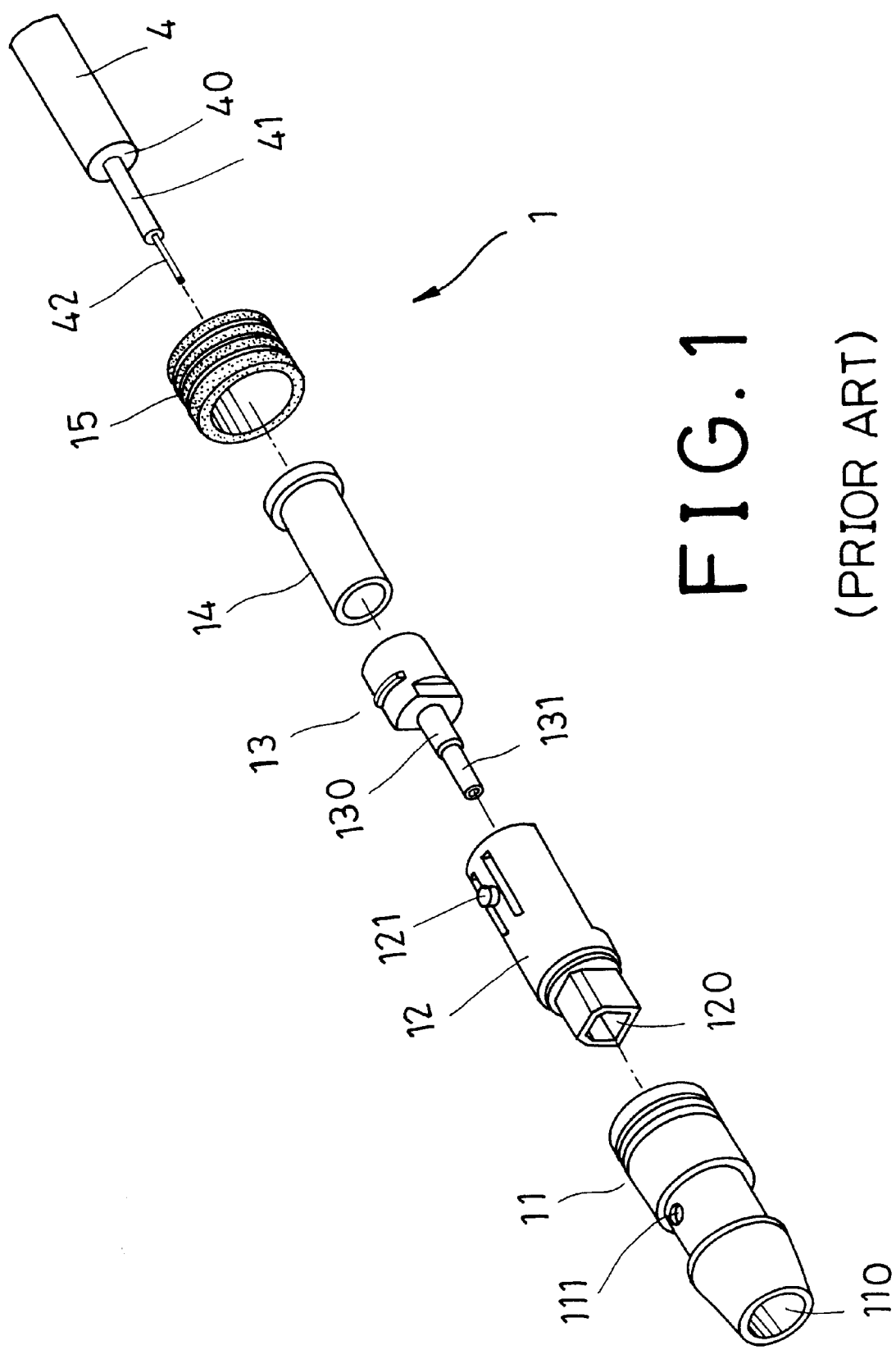
FIG. 1 is an exploded perspective view of a known conventional optical fiber connecter.
Figure 2:
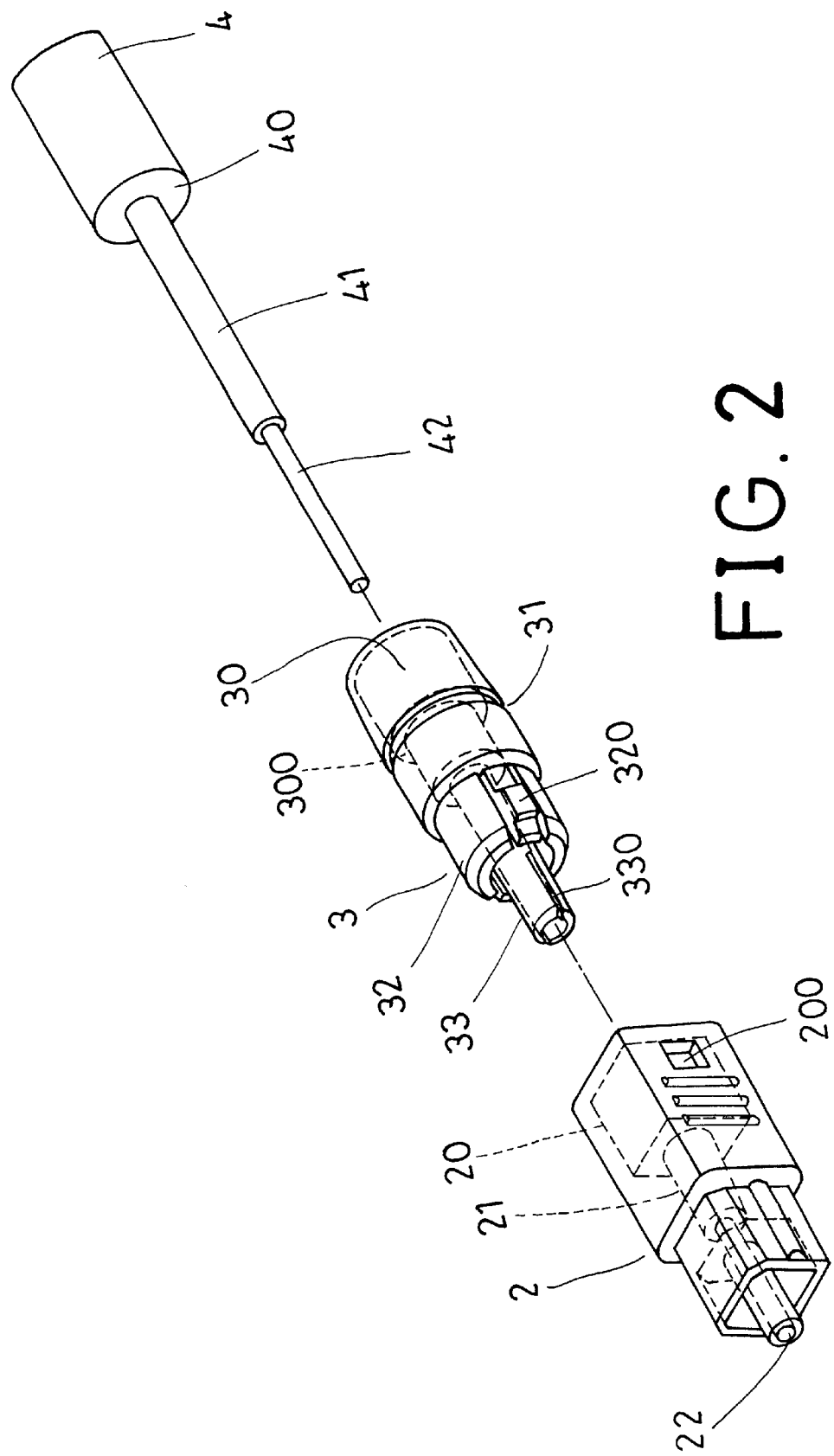
FIG. 2 is an exploded perspective view of an optical fiber connecter in the present invention; and, FIG. 3 is a side cross-sectional view of the optical fiber connecter in the present invention.

A preferred embodiment of an optical fiber connecter in the present invention, as shown in FIG. 2, includes a connect head 2 and an inserting connect member 3 as main components combined together.

The connect head 2 is provided in a rear portion with a chamber 20 having insert holes 200 in two opposite sidewalls, and its front portion connected with a neck member 21 forming a conical channel. The front end of the neck member 21 is connected with a fiber tube 22 with a smaller diameter than that of the neck member 21, forming a stepped passageway gradually shrunk outward for the core 42 of the optical fiber 4 to thread out.

Then, the inserting connect member 3 is connected to the connect head 2, having a stepped gradually-shrunk passageway 30 in a center hollow and a stop rim 300 disposed inside at a proper position for stopping the front end of the outer layer 40 of optical fiber 4. Further, the inserting connect member 3 is provided with an annular groove 31 in an outer surface, a connect portion formed in an intermediate portion and having two opposite elastic projections 320 corresponding to the engage holes 200 of the chamber 20 of the connect head 2, and a tapered tube 33 protruding out of the front end of the connect portion 32 and having plural lengthwise slots 330 spaced apart to elastically shrink and then tightly clamp the intermediate covered layer 41 of the optical fiber 4 after the intermediate layer 41 threads through therein.

Figure 3:
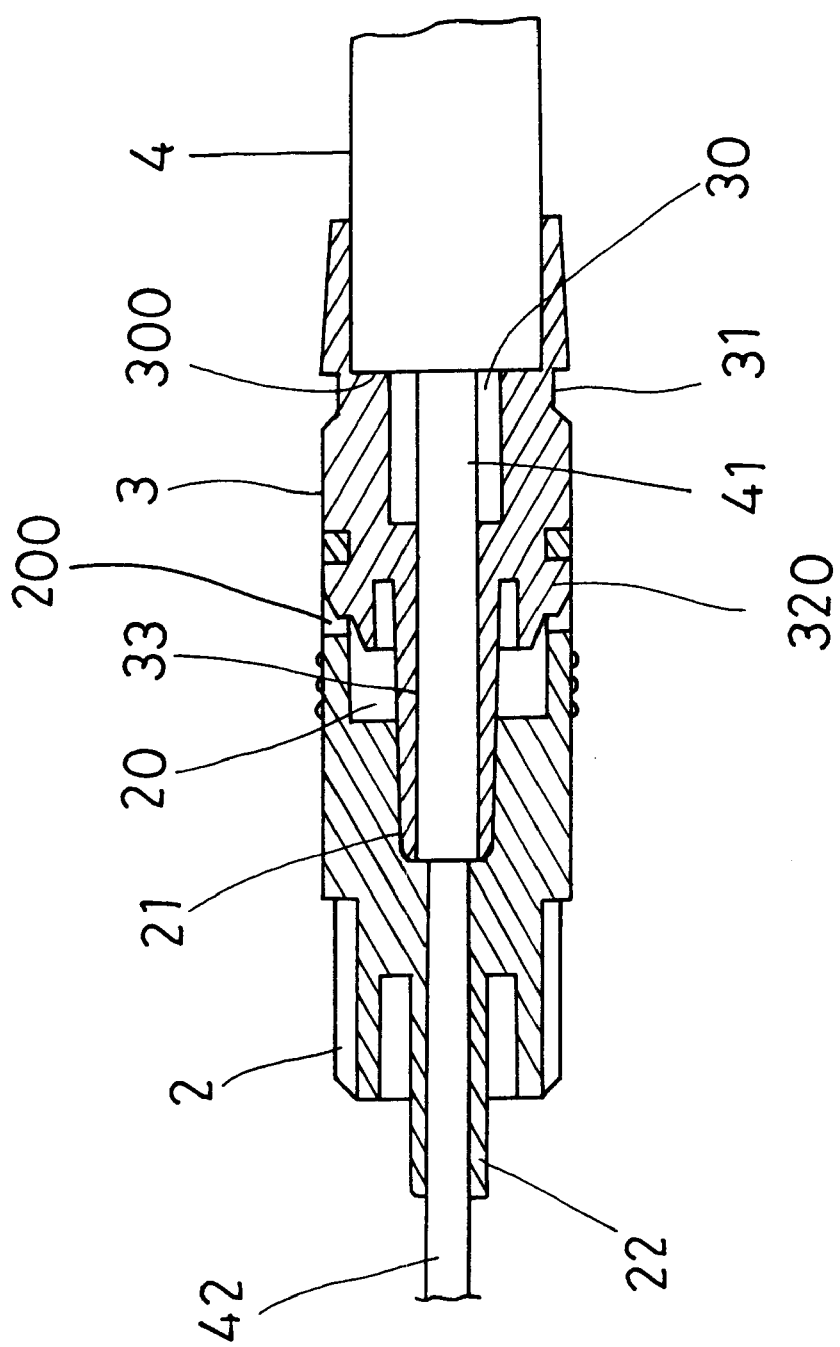

In assembling and using, as shown in FIGS. 2 and 3, firstly, thread the optical fiber 4 through the passageway 30 in the inserting connect member 3 and push the front end of the outer layer 40 of the optical fiber 4 forward to touch the stop rim 300 of the connect base 3 and synchronously the intermediate layer 41 of the optical fiber 4 fitted into the tapered tube 33 of the connect base 3. Then the tapered tube 33 of the inserting connect member 3 is directly inserted in the chamber 20 of the connect head 2, and pushed forward to let the two elastic projections 320 of the connect portion 32 respectively engaged with the insert holes 200 of the chamber 20 of the connect head 2, thus, the connect base 3 and the connect head 2 tightly connected by means of mutual engagement.

In addition, after the tapered tube 33 of the connect base 3 is inserted in the tapered neck member 21, it is forced to elastically shrink by a comparatively small inner diameter of the tapered neck member 21, accordingly letting the optical fiber 4 positioned stably therein, with its core 42 extending out of the tube 22 of the connect head 2, finishing the assembly of a optical fiber connecter ready for use.

Compared with the known conventional optical fiber connecters, this invention has the following advantages:

1. There are fewer components needed for making up an optical fiber connecter, and it can be assembled with quickness and convenience, enhancing assembling efficiency.
2. Components can be manufactured easier, reducing their cost.
3. The assembly of the components is stable, elevating stability for connecting or inserting an optical fiber.

4. It is applicable to various optical fibers of any diameters, and convenient for replacing new optical fibers.

While the preferred embodiment of the invention has been described above, it will be recognized and understood that various modifications may be made therein and the appended claims are intended to cover all such modifications that may fall within the spirit and scope of the invention.

What is claimed is:

1. An optical fiber connecter comprising:

a connect head with a step shaped intermediate hollow, having a chamber in a rear portion, a front end of said chamber connected with a neck member having an inner conical passageway, and a front portion of said neck member connected with a tube;

an inserting connect member fitted in said connect head, having a passageway of a stepped shape formed in its interior; and, characterized by said connect head having two opposite insert holes provided in two opposite side-walls of said chamber of said connect head, and said connector member having a stop rim in an inner wall of a rear portion of said passageway of said connector member, a front portion of said inserting connect member gradually shrunk in a stepped shape, an intermediate portion of said inserting connect member forming a connect portion having two elastic insert blocks corresponding to said two insert holes of said chamber of said connect head, a tapered tube protruding out of a front end of said connect portion of said inserting connect member, and said tapered tube having plural lengthwise slots spaced apart to shrink elastically;

whereby firstly an optical fiber treaded through said connector member, then engaging said connector member with said connect head, and lastly a core of said optical fiber threaded out of said tube of said inserting connect member, thus finishing assembly of said optical fiber connecter with ease and quickness.

* * * * *